(12) United States Patent
Thangarasa et al.

(10) Patent No.: US 10,674,437 B2
(45) Date of Patent: Jun. 2, 2020

(54) CONFIGURATION OF AUTONOMOUS GAPS BASED ON REPETITION LEVEL IN ENHANCED COVERAGE

(71) Applicant: Telefonaktiebolaget LM Ericsson (publ), Stockholm (SE)

(72) Inventors: Santhan Thangarasa, Vällingby (SE); Joakim Axmon, Limhamn (SE); Muhammad Kazmi, Sundbyberg (SE); Kazuyoshi Uesaka, Kawasaki (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 35 days.

(21) Appl. No.: 16/067,639

(22) PCT Filed: Jan. 12, 2017

(86) PCT No.: PCT/SE2017/050025
§ 371 (c)(1),
(2) Date: Jul. 2, 2018

(87) PCT Pub. No.: WO2017/123144
PCT Pub. Date: Jul. 20, 2017

(65) Prior Publication Data
US 2019/0007893 A1    Jan. 3, 2019

Related U.S. Application Data

(60) Provisional application No. 62/278,174, filed on Jan. 13, 2016.

(51) Int. Cl.
*H04W 48/12* (2009.01)
*H04W 4/70* (2018.01)
*H04W 84/04* (2009.01)

(52) U.S. Cl.
CPC .............. *H04W 48/12* (2013.01); *H04W 4/70* (2018.02); *H04W 84/042* (2013.01)

(58) Field of Classification Search
CPC ....... H04W 4/70; H04W 24/02; H04W 24/10; H04W 24/04; H04W 36/0061;
(Continued)

(56) References Cited

U.S. PATENT DOCUMENTS

2009/0274086 A1\* 11/2009 Petrovic ............... H04J 11/0093
370/312
2014/0098761 A1    4/2014 Lee et al.
(Continued)

FOREIGN PATENT DOCUMENTS

CN    104348573 A    2/2015
EP    3026857 A1     6/2016
(Continued)

OTHER PUBLICATIONS

European Office Action Communication for EP Application No. 17701602.9 dated Sep. 9, 2019—6 pages.
(Continued)

*Primary Examiner* — Marsha D Banks Harold
*Assistant Examiner* — Elton Williams
(74) *Attorney, Agent, or Firm* — Sage Patent Group

(57) ABSTRACT

Methods and apparatuses disclosed herein involve network-side operations that include adjusting scheduling or reporting times of a wireless device, to accommodate acquisition of neighbor-cell System Information, SI, by the device while operating under conditions of enhanced coverage with respect to the neighbor cell. Further disclosed are network-side operations that include determining the repetition level to be used for transmitting SI, for providing enhanced coverage to one or more wireless devices. Additionally, disclosed device-side operations include configuring the
(Continued)

autonomous gaps used in a SI acquisition procedure, in dependence on the number of repetitions determined to be needed for acquiring the SI of a neighbor cell, while the device is operating under enhanced coverage with respect to the neighbor cell.

20 Claims, 8 Drawing Sheets

(58) Field of Classification Search
CPC . H04W 36/0077; H04W 48/10; H04W 72/04; H04W 36/0085; H04L 27/2655; H04J 11/0093
See application file for complete search history.

(56) References Cited

U.S. PATENT DOCUMENTS

| | | | |
|---|---|---|---|
| 2014/0112180 A1* | 4/2014 | Axmon | H04W 24/10 370/252 |
| 2014/0204866 A1 | 7/2014 | Siomina et al. | |
| 2015/0131579 A1 | 5/2015 | Li et al. | |
| 2016/0345119 A1* | 11/2016 | Futaki | H04W 4/70 |

FOREIGN PATENT DOCUMENTS

| | | |
|---|---|---|
| WO | 2015018342 A1 | 2/2015 |
| WO | 2015116870 A1 | 8/2015 |
| WO | 2017015465 A1 | 1/2017 |

OTHER PUBLICATIONS

3GPP, "E-UTRAN FDD intra frequency measurements with autonomous gaps for UE category M1 with CE mode B", 3GPP TS 36.133 V135.0, Sep. 2016, pp. 61-63.

ETSI, "LTE; Evolved Universal Terrestrial Radio Access (E-UTRA); Radio Resource Control (RRC); Protocol specification (3GPP TS 36.331 version 13.0.0 Release 13)", ETSI TS 136 331 V13.0.0, Jan. 2016, pp. 1-670.

ETSI, "LTE; Evolved Universal Terrestrial Radio Access (E-UTRA); Requirements for support of radio resource management (3GPP TS 36.133 version 13.2.0 Release 13)", ETSI TS 136 133 V13.2.0, Apr. 2016, 1pp. 1519.

Gunnarsson, Fredrik, "Self-organization", Heterogeneous Cellular Networks, Cambridge University Press, May 2013, pp. 145-178.

Unknown, Author, "Measurement requirements for Rel-13 MTC UE under enhanced coverage", 3GPP TSG-RAN WG4 Meeting #77 NB-IOT AH, R4-77AH-IoT-0076, Budapest, Hungary, Jan. 20-22, 2016, pp. 1-15.

Unknown, Author, "Remaining issues of SI reading requirements for eMTC", 3GPP TSG RAN WG4 Meeting #77 NB-IOT AH, R4-77AH-IoT-0068, Budapest, Hungary, Jan. 20-22, 2016, pp. 1-4.

Unknown, Author, "SI Reading Requirements for eMTC", 3GPP TSG RAN WG4 Meeting #77, R4-157723, Ericsson, Anaheim, US, Nov. 16-20, 2015, 6 pages.

* cited by examiner

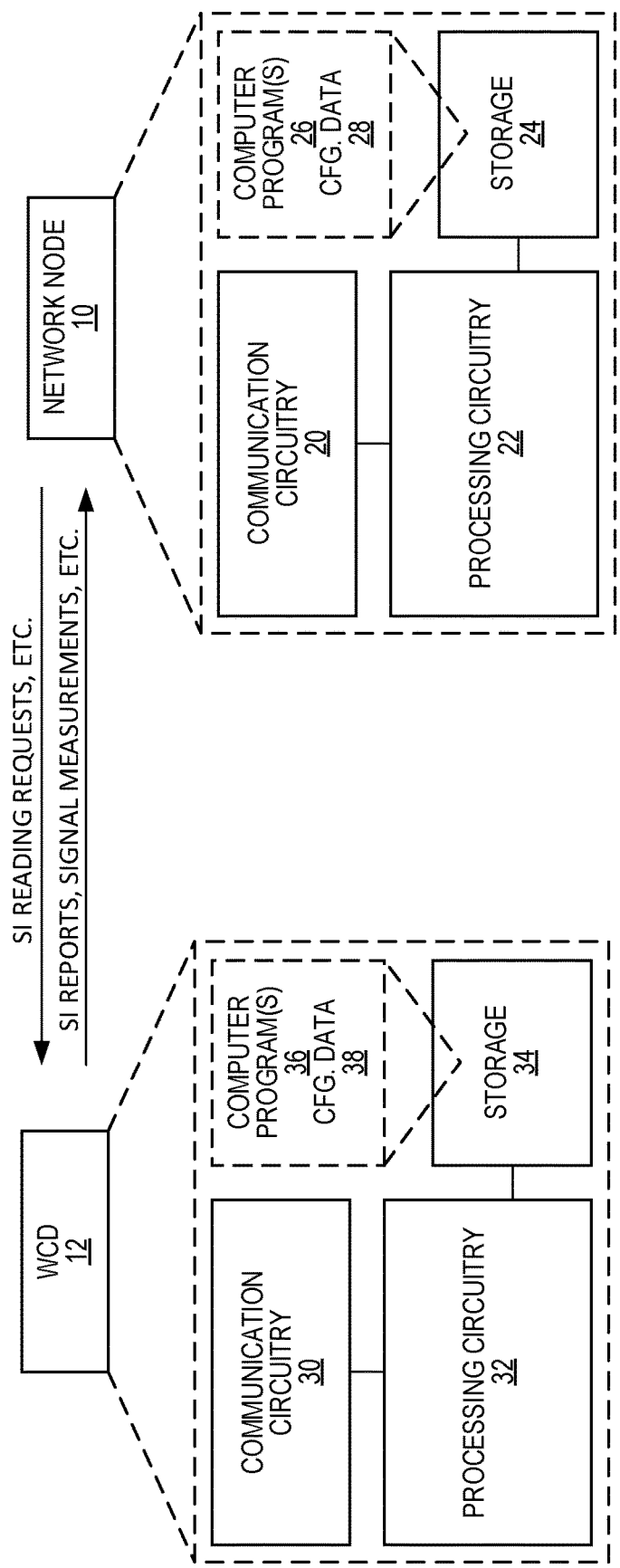
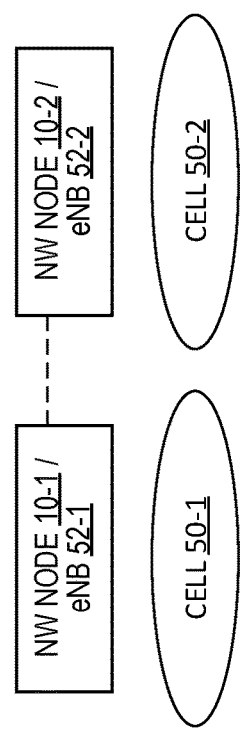
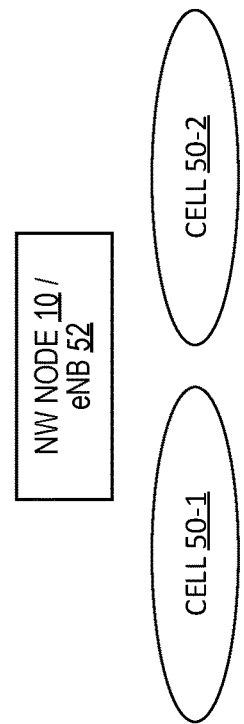
FIG. 1
FIG. 2B
FIG. 2C

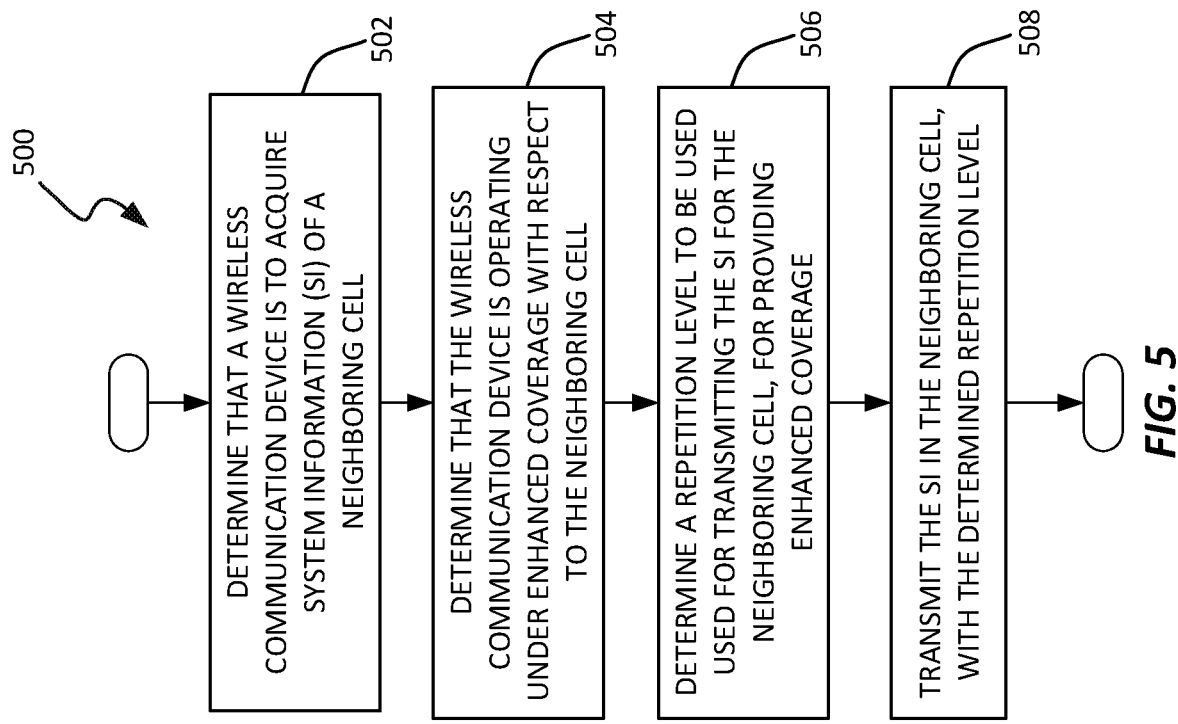

FIG. 6

| Serving cell | | Target cell | |
|---|---|---|---|
| SNR [dB] | Minimum ACK/NACK requirement | MIB repetition level | SIB1bis repetition level |
| ≥ -6 | Requirements may apply. It can be as stated in Figure 9 | 4 | 4 |
| < -6 | N/A | 4 | 4 |

FIG. 7

| Serving cell | | Target cell | |
|---|---|---|---|
| SNR [dB] | Minimum ACK/NACK requirement | MIB repetition level | SIB1bis repetition level |
| ≥ -6 | Requirements may apply. It can be as stated in Figure 9 | CE1 | 4 |
| | | CE2 | 4 |
| | | CE3 | 4 |
| < -6 | N/A | CE1 | 4 |
| | | CE2 | 4 |
| | | CE3 | 4 |

| No repetition in serving cell. Target cell is FDD with MIB and SIB1bis repetition. Subframe patterns indicate presence of gap in the source cell by (1) and absence by (0). | | Minimum number of A/Ns per configuration | | | | | | | |
|---|---|---|---|---|---|---|---|---|---|
| | | FDD | TDD #0 | TDD #1 | TDD #2 | TDD #3 | TDD #4 | TDD #5 | TDD #6 |
| Proposed minimum requirements | | 74[1] | 25[2] | 39[3] | 55[4] | 38[5] | 45[6] | 34[7] | 31[8] |
| Exemplary pattern eMTC1 | Subframe 0:9 | | | | | | | | |
| AGC is carried out immediately before start of the MIB acquisition, in target cell subframe 9. No bandwidth reconfiguration needed between MIB and SIB1 reading. | 1 1 1 1 0 0 0 0 0 0 | Radio frame 0:18 | | | | | | | |
| | 1 1 1 1 0 0 0 0 0 0 | | | | | | | | |
| | 1 1 1 1 0 0 0 0 0 0 | | | | | | | | |
| | 1 1 1 1 0 0 0 0 0 0 | | | | | | | | |
| | 1 1 1 1 0 0 0 0 0 1 | 74 | 25 | 39 | 55 | 38 | 45 | 34 | 31 |
| | 1 1 1 1 0 0 0 1 1 0 | | | | | | | | |
| | 0 0 0 0 1 1 1 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 0 1 1 0 | | | | | | | | |
| | 0 0 0 0 1 1 1 1 1 0 | | | | | | | | |
| | 0 0 0 0 0 0 0 0 0 0 | | | | | | | | |
| Notes 1-8: An additional margin may be subtracted after alignment in the standardization. The additional margin may be different for any of (1) through (8). | | | | | | | | | |

*FIG. 9*

| Serving cell | | Target cell | |
|---|---|---|---|
| SNR [dB] | Minimum ACK/NACK requirement | MIB repetition level | SIB1bis repetition level |
| ≥ -6 | 74 | 4 | 4 |
| < -6 | N/A | 4 | 4 |

CONFIGURATION OF AUTONOMOUS GAPS BASED ON REPETITION LEVEL IN ENHANCED COVERAGE

TECHNICAL FIELD

The present invention relates to wireless communication networks and particularly relates to the acquisition of System Information, SI, in wireless communication networks that provide enhanced coverage.

BACKGROUND

Efforts to evolve wireless communication networks for supporting new types of devices and their associated applications include so called "enhanced coverage" techniques, with an eye towards extending network coverage for devices situated in challenging signal environments. Consider Machine Type Communication, MTC, devices, for example, such as networked sensors or meters. Such devices oftentimes operate in indoors installations, such as in basements or other areas where it is difficult to receive wireless signals from the network within the signal-level ranges associated with "normal" coverage scenarios.

Here, it shall be appreciated that wireless communication networks and the devices intended for operation in such networks are designed to work with defined ranges of received signal strength and those ranges define the "normal" coverage provided by the network. Enhanced coverage allows devices to operate with lower-than-normal signal levels, which effectively extends the coverage area of the network, albeit with certain additional challenges.

For example, it is recognized herein that the System Information, SI, acquisition procedure defined in the Third Generation Partnership Project, 3GPP, Release 12 specifications for "Category 0" User Equipments, UEs, will not work for a UE operating as an enhanced MTC, eMTC, device according to the enhanced-coverage provisions of the 3GPP Release 13 specifications. A key difference in this case involves the number of "repetitions" needed by the eMTC device to acquire the SI of a neighboring cell, in instances where the eMTC device is operating under enhanced coverage with respect to the neighboring cell. Because of the lower than normal received signal strength associated with its operation under enhanced coverage, the eMTC device needs multiple receptions of the neighbor-cell SI.

In turn, "tuning" the radio circuitry of the eMTC device to the neighbor cell for multiple reception instances extends the time during which the eMTC device is not available for scheduled transmissions in its serving cell(s). For example, the eMTC device may be a low-complexity device that is not capable of full duplex operation and is not capable of tuning to more than one cell at a time. Here, typical items of SI needed to determine the Cell Global Identifier, CGI, of the neighbor cell include the Master Information Block, MIB, and the System Information Block 1, SIB1, and the contemplated SI acquisition may involve intra-frequency, inter-frequency, or inter-RAT acquisition, where "RAT" denotes Radio Access Technology. As a further problem, neighbor-cell SI reporting may be delayed in cases where the reporting device is operating under enhanced coverage with respect to the involved cell.

SUMMARY

Methods and apparatuses disclosed herein involve network-side operations that include adjusting scheduling or reporting times of a wireless device, to accommodate acquisition of neighbor-cell System Information, SI, by the device while operating under conditions of enhanced coverage with respect to the neighbor cell. Further disclosed are network-side operations that include determining the repetition level to be used for transmitting SI, for providing enhanced coverage to one or more wireless devices. Additionally, disclosed device-side operations include configuring the autonomous gaps used in a SI acquisition procedure, in dependence on the number of repetitions determined to be needed for acquiring the SI of a neighbor cell, while the device is operating under enhanced coverage with respect to the neighbor cell.

In one example, a method of operation at a network node of a wireless communication network, "network", includes determining that a wireless communication device, "device", is operating under enhanced coverage with respect to a neighboring cell of the network. The method further includes determining a repetition level used for transmitting SI for the neighboring cell, for providing the enhanced coverage from the neighboring cell, and adapting operation of the device as a function of the repetition level. The adapting includes adjusting at least one of the following to account for additional autonomous gaps needed by the device to acquire the SI of the neighboring cell while operating under the enhanced coverage with respect to the neighboring cell: a time at which the device is scheduled in its serving cell for data transmission or reception; and a time at which the device is requested to acquire the SI of the neighboring cell.

In a corresponding example, a network node is configured for operation in a network and it includes communication circuitry and operatively associated processing circuitry. The processing circuitry is configured to determine that a device is operating under enhanced coverage with respect to a neighboring cell of the network, determine a repetition level used for transmitting SI for the neighboring cell, for providing the enhanced coverage from the neighboring cell, and adapt operation of the device as a function of the repetition level. The adapting may be as described in the immediately above example method.

In another example of network-side operations, a method of operation at a network node includes determining that a device is to acquire SI of a neighboring cell, determining that the device is operating under enhanced coverage with respect to the neighboring cell, determining a repetition level to be used for transmitting the SI for the neighboring cell, for providing the enhanced coverage from the neighboring cell, and transmitting the SI in the neighboring cell with the determined repetition level. In one example, the network node is a base station associated with the neighboring cell. Alternatively, the network node is a base station associated with both the neighboring cell and the device's serving cell. In yet another alternative, the network node may be remote from the involved base station(s) and/or may otherwise be centralized with respect to one or more base stations.

In any case, an example of such a network node includes communication circuitry and processing circuitry operatively associated with the communication circuitry. The processing circuitry is configured to determine that a device is to acquire SI of a neighboring cell, determine that the device is operating under enhanced coverage with respect to the neighboring cell, determine a repetition level to be used for transmitting the SI for the neighboring cell, for providing the enhanced coverage from the neighboring cell, and transmit the SI in the neighboring cell with the determined repetition level. In cases where the network node is not integrated with or co-located with the involved network transmitter(s), the network node is configured to transmit the SI at the determined repetition level, based on causing the involved network transmitter(s) to perform such transmissions with the determined repetition level.

Example device-side operations include a method of operation in a device that includes receiving a request to acquire SI for a neighboring cell that neighbors a serving cell of the device. Here, the serving and neighboring cells are included in a wireless communication network and the device is operating under enhanced coverage with respect to the neighboring cell. The method further includes the device determining a number of repetitions needed by the device for acquiring the SI of the neighboring cell, where repetitions in question are repeated transmissions of the SI for the neighboring cell. The method also includes the device configuring a SI acquisition procedure to be performed by the device to acquire the SI for the neighboring cell, in dependence on the determined number of repetitions. The configuring includes the device configuring the number of autonomous gaps to be used by it for acquiring the SI for the neighboring cell.

In a corresponding apparatus example, a device is configured for operation in a wireless communication network and it includes communication circuitry configured for communicating with the network. The device also includes processing circuitry that is operatively associated with the communication circuitry and is configured to receive a request to acquire SI for a cell that neighbors its serving cell. In this context, the device is operating under enhanced coverage with respect to the neighboring cell, and the processing circuitry is correspondingly configured to determine a number of repetitions needed by the device for acquiring the SI of the neighboring cell. The repetitions in question are repeated transmissions of the SI for the neighboring cell, and the processing circuitry is configured to configure a SI acquisition procedure to be performed by the device to acquire the SI for the neighboring cell, in dependence on the determined number of repetitions. The configuration decisions include configuring the number of autonomous gaps to be used by the device for acquiring the SI for the neighboring cell.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of example embodiments of a network node configured for operation in a wireless communication network, and a wireless communication device also configured for operation in the network.

FIGS. 2A, 2B, and 2C are block diagrams of example arrangements for a wireless communication network.

FIG. 5 is a logic flow diagram of another embodiment of a method of processing at a network node.

FIGS. 6 and 7 are tables depicting example received-signal levels or ranges for different enhanced-coverage levels or modes, e.g., Coverage Enhancement Mode 1, CE1, CE2, and so on.

FIG. 9 is a table providing further example details for minimum ACK/NACK transmissions by a device with respect to a serving cell, for given TDD configurations of the neighboring cell for which the SI is to be acquired.

FIG. 10 is another table showing example minimum ACK/NACK requirements for different coverage-enhancement levels.

DETAILED DESCRIPTION

Figure 2A:
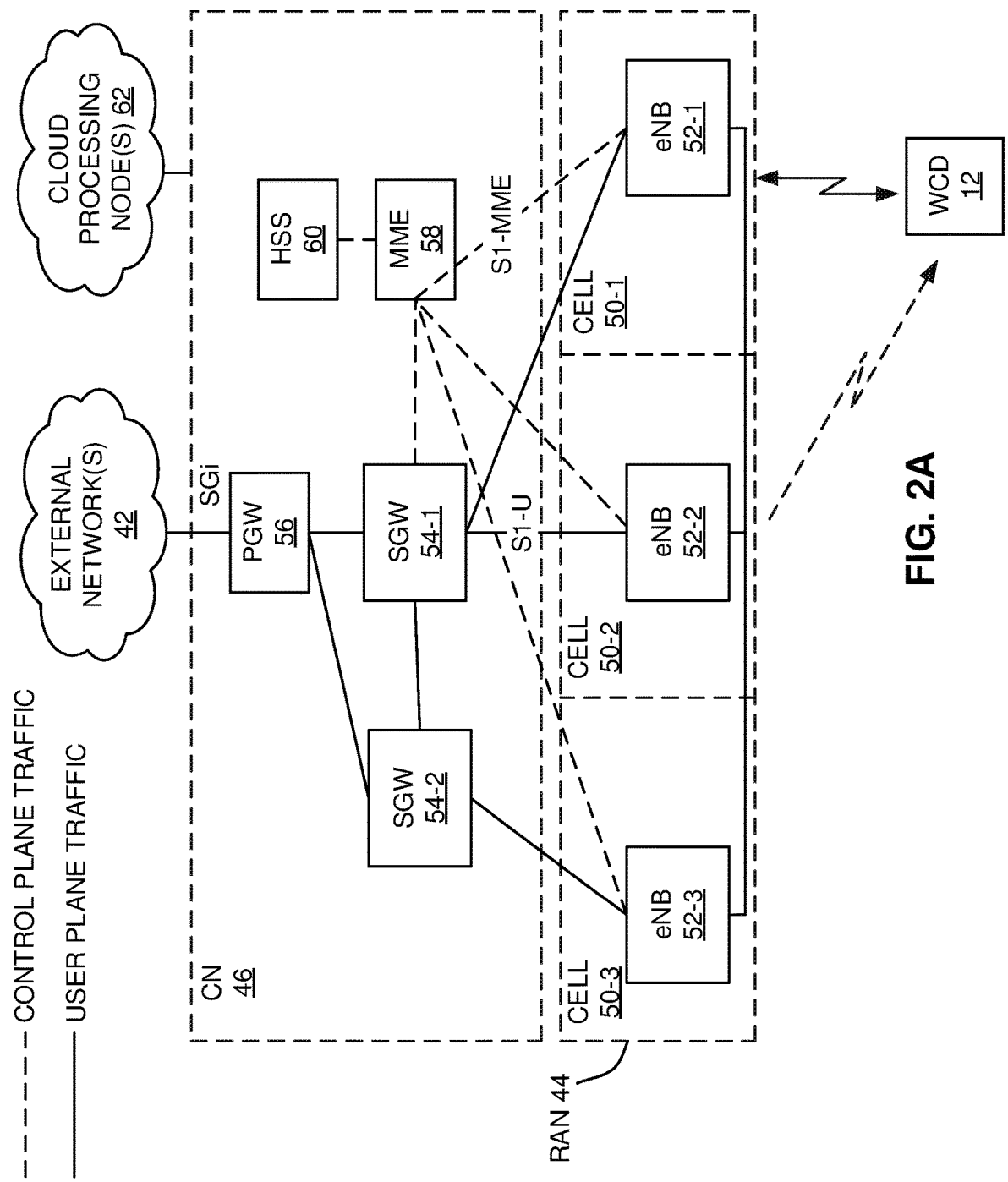

FIG. 1 illustrates example embodiments of a network node 10, "node 10", and a wireless communication device 12, "device 12", depicted as "WCD 12". Both the node 10 and the device 12 are configured for operation in a wireless communication network—not shown—such as a Long Term Evolution, LTE, network that operates according to the relevant specifications promulgated by the Third Generation Partnership Project, 3GPP. In 3GPP parlance, the device 12 may be referred to as a User Equipment or UE.

As a non-limiting example, the device 12 comprises an embedded communication device or module, such as used for an Internet of Things, IoT, or Machine Type Communication, MTC, device. The device 12 may be an enhanced MTC, eMTC, device according to the Release 13 specifications of the 3GPP, configured for operation in normal coverage and enhanced coverage modes. When operating under "enhanced" coverage with respect to a "cell" in the network, the device 12 and/or the supporting network node operate with received-signal levels that are below the range(s) defined for normal-coverage operation.

The node 10 comprises, for example, a base station or other radio network node, such as an eNB in the LTE context. However, the node 10 is not limited to implementation as or in a base station. Broadly, the node 10 comprises communication circuitry 20, processing circuitry 22, and storage 24. The processing circuitry 22 is operatively associated with the communication circuitry 20. In embodiments where the node 10 communicates directly with the device 12, the communication circuitry 20 comprises, for example, one or more cellular radio circuits, such as a transceiver comprising a receiver circuit and a transmitter circuit, along with associated transmit and receive processing circuitry. In embodiments where the node 10 communicates indirectly with the device 12, or communicates with one or more other nodes in the network, which may in turn communicate with the device 12, the communication circuitry 20 includes one or more interface circuits for communicatively coupling to such other nodes. Of course, the communication circuitry 20 may include multiple interface circuits, for communicating with the device 12 and with one or more other nodes in the network.

The processing circuitry 22 comprises fixed circuitry, programmed circuitry, or a mix of fixed and programmed circuitry. In an example embodiment, the processing circuitry 22 comprises one or more microprocessor-based circuits or one or more DSP-based, FPGA-based, or ASIC-based circuits, or any mix thereof. In at least one embodiment, the processing circuitry 22 is specially adapted or otherwise configured to operate according to the network-side method(s) disclosed herein, via the execution of computer program instructions comprising a computer program 26 held in the storage 24. The processing circuitry 22 may further use and or store various items of configuration data 28 associated with such operation. For example, information relating to repetition levels associated with different levels or modes of coverage enhancement may be stored.

The storage 24 comprises any one or more of solid-state storage, disk storage, etc., and may provide both volatile, working memory and non-volatile, program and data storage, and thus may include a mix of memory or storage circuit or device types. Non-limiting examples include SRAM or DRAM, FLASH, EEPROM, and Solid State Disk (SSD) storage. In any case, it shall be understood that in one or more embodiments, the storage 24 includes a non-transitory computer-readable medium storing a computer program 26, the execution of which by processing circuitry 22 in the network node 20 configures the processing circuitry 22 according to the teachings herein. Non-transitory, as used here, does not necessarily mean permanent or unchanging, but does denote storage of at least some persistence.

Similarly, the device 12 comprises communication circuitry 30, processing circuitry 32, and storage 34. The communication circuitry 30 comprises, for example, one or more cellular radio circuits, such as a transceiver comprising a receiver circuit and a transmitter circuit, along with associated transmit and receive processing circuitry. The communication circuitry 30 may also include other types of communication interface circuitry, e.g., for near-field communications, Wi-Fi, Bluetooth, etc.

The processing circuitry 32 comprises fixed circuitry, programmed circuitry, or a mix of fixed and programmed circuitry. In an example embodiment, the processing circuitry 32 comprises one or more microprocessor-based circuits or one or more DSP-based, FPGA-based, or ASIC-based circuits, or any mix thereof. In at least one embodiment, the processing circuitry 32 is specially adapted or otherwise configured to operate according to the device-side method(s) disclosed herein, via the execution of computer program instructions comprising a computer program 36. The processing circuitry 32 may further use and or store various items of configuration data 38 associated with such operation.

The storage 34 comprises any one or more of solid-state storage, disk storage, etc., and may provide both volatile, working memory and non-volatile, program and data storage, and thus may include a mix of memory or storage circuit or device types. Non-limiting examples includes SRAM or DRAM, FLASH, EEPROM, and Solid State Disk (SSD) storage. In any case, it shall be understood that in one or more embodiments the storage 34 includes a non-transitory computer-readable medium storing a computer program 36, the execution of which by processing circuitry 32 in the device 12 configures the processing circuitry 32 according to the teachings herein.

Before delving into example operational details for the node 10 and the device 12, consider the example network details depicted in FIGS. 2A, 2B, and 2C. In FIG. 2A, an example wireless communication network 40, "network 40", provides communication services to a device 12—depicted as "WCD 12" in the diagram.

The network 40 comprises, for example, a wide-area cellular radio network based on the LTE standard, or based on another 3GPP standard. The network 40 includes a Radio Access Network or RAN 44, along with a Core Network or CN 46. The network 40 communicatively couples essentially any number of devices 12 to each other, or to any number of other systems or devices reachable through one or more external networks 18. Only one device 12 is shown but there may be many such devices operating within the network 40. It shall also be understood that the devices 12 supported by the network 40 are not necessarily all of the same type or function. Example devices 12 include any one or more of smartphones, feature phones, wireless computers, communication network adaptors, dongles, etc. In a useful working example, the device 12 depicted in FIG. 2A may be assumed to be an eMTC device, an IoT device, or any other device that may operate under enhanced-coverage conditions with respect to one or more cells 50 of the network 40.

In general, the RAN 44 provides a number of cells 50, which may be understood as comprising or corresponding to areas of geographic coverage, e.g., cell 50-1, cell 50-2, and cell 50-3. Respective cells 50 may overlap one another at least to some extent, but it is not necessary that the cells 50 have the same size, or operate on the same frequencies, or even use the same Radio Access Technology (RAT). However, for simplicity, each cell 50 in the diagram is provided by or associated with a corresponding eNB 52, e.g., the eNB 52-1 is associated with the cell 50-1, the eNB 52-2 is associated with the cell 50-2, and so on. It will be appreciated that the signal levels defined for normal-coverage operation define or correspond to the coverage area of any given cell 50, and that the effective coverage area of the cell 50 may be extended by allowing the involved device(s) and radio network nodes to operate with lower-than-normal signal levels.

The CN 46 in the diagram includes multiple nodes supporting the RAN 44, including one or more Serving Gateways, SGWs, 54, e.g., 54-1 and 54-2, and a supporting Packet Gateway, PGW, 56, for interfacing the network 40 to the external network(s) 42. The CN 46 further includes one or more Mobility Management Entities, MMES, 58, a Home Subscriber Server, HSS, 60, or the like, and may be further associated with one or more cloud-based processing nodes 62. Of course, the particular names and functions of the illustrated entities are associated with LTE/E-UTRAN specifications, and other types of networks may use different terminology and/or use different arrangements of network entities and functions.

The node 10 introduced in FIG. 1 may be implemented as one or more of the eNBs 52, which is to say that one or more of the eNBs 52 may be configured to operate as a node 10. However, the node 10 may be implemented as a separate node in the RAN 44 or in the CN 46, or may be integrated elsewhere within the network 40. In such cases, a given node 10 may serve a subset of eNBs 52 in the network 40, or otherwise be dedicated to a given area or zone of the network 40, and there may be multiple such nodes 10 operating in the network 40.

Wherever implemented, in one example, the communication circuitry 20 of the node 10 is configured for communicating with at least one of the devices 12 operating in the network 40 and one or more other nodes in the network 40. The processing circuitry 22 of the node 10 is configured to determine that the device 12 is operating under enhanced coverage with respect to a neighboring cell, e.g., the cell 50-2 as a neighbor of the cell 50-1, which may be a serving cell of the device 12 in question.

The processing circuitry 22 is further configured to determine a repetition level used for transmitting SI for the neighboring cell 50-2, for providing the enhanced coverage from the neighboring cell 50-2, and to adapt operation of the device 12 as a function of the repetition level. In at least some embodiments, the processing circuitry 22 is configured to adapt the operation of the device 12 by adjusting at least one of the following to account for additional autonomous gaps needed by the device 12 to acquire the SI of the neighboring cell 50-2 while operating under the enhanced coverage with respect to the neighboring cell 50-2: a time at which the device 12 is scheduled in the serving cell 50-1 for data transmission or reception; and a time at which the device 12 is requested to acquire the SI of the neighboring cell 50-2.

In one example, in response to determining that the SI acquisition procedure will collide with one or more scheduled transmissions to or from the device 12, the processing circuitry 22 adapts the scheduling to avoid the collisions. That is, the SI acquisition procedure is not delayed and, instead, the scheduling is adjusted. Alternatively, the processing circuitry 22 may defer or move the time at which it requests the device 12 to acquire the neighbor-cell SI, to avoid the SI acquisition procedure from colliding with one or more data transmissions in the serving cell that involve the device 12.

The processing circuitry 22 in one or more embodiments is configured to adapt the operation of the device 12 as a function of the repetition level, based on adapting the operation responsive to the repetition level exceeding a defined threshold or value, and otherwise not adapting the operation. That is, unless the repetition level is greater than a certain value or threshold, the processing circuitry 32 does not perform the adapting. In more detail, there may be multiple levels of coverage enhancement, e.g., levels associated with increasingly lower signal levels representing increasingly extreme extensions of coverage. It may be that the node 10 does not perform the adapting operation unless the device 12 is operating in one of the more extreme levels of coverage enhancement with respect to the cell 50 for which the SI is to be acquired.

In an example approach, the processing circuitry 22 is configured to adapt the operation of the device 12 as a function of the repetition level by estimating, based on the repetition level, whether a SI acquisition procedure to be performed by the device 12 with respect to the neighboring cell 50-2 will interfere with a scheduled data transmission to or from the device 12 in the serving cell 50-1. If so, the processing circuitry 22 reschedules the data transmission to avoid being interfered with by the SI acquisition procedure, or delays the SI acquisition procedure to avoid interfering with the scheduled data transmission.

As another example of configuration details, the processing circuitry 22 in one or more embodiments is configured to base its estimation of whether the SI acquisition procedure will interfere with a scheduled data transmission involving the device 12, at least in part on received signal levels reported by the device 12 for the neighboring cell 50-2. Here, higher received signal levels are associated with the device 12 needing relatively fewer autonomous gaps to acquire the SI of the neighboring cell 50-2 and lower received signal levels are associated with the device 12 needing relatively more autonomous gaps to acquire the SI of the neighboring cell 50-2.

As an example of the contemplated processing circuitry configuration, the processing circuitry 22 may estimate that the SI acquisition procedure will interfere with the scheduled data transmission if the received signals levels associated with enhanced-coverage operation of the device 12 are below a certain threshold—suggesting that the device 12 will need most or all of the neighbor-cell SI repetitions to acquire the SI successfully. Conversely, the processing circuitry 22 may estimate that the SI acquisition procedure will not interfere with the scheduled data transmission, if the received signal levels are above a certain threshold—suggesting that the device 12 will not need most or all of the repetitions to acquire the SI successfully.

In the same or other embodiments, the processing circuitry 22 is configured to adjust the times at which the device 12 is scheduled in the serving cell 50-1 for data transmission or reception by adjusting scheduling of the device 12 in the serving cell 50-1 to avoid scheduling data transmissions to or from the device 12 at times known or estimated to coincide with the autonomous gaps created by the device 12 for acquiring the SI of the neighboring cell 50-2.

In one example configuration, the processing circuitry 22 estimates the gap occurrences at the device 12 based on knowing or estimating the times at which the SI is transmitted in the neighboring cell 50-1. The serving cell 50-1 and the neighboring cell 50-2 may have the same timing, or they otherwise may be synchronized. Consequently, the known or estimated timing relationship between the serving cell 50-1 and the neighboring cell 50-2 allows the node 10 to estimate or otherwise determine any relative timing offset between the cells 50-1 and 50-2, as a basis for knowing when the SI transmission occurrences will occur in the neighboring cell 50-2. In general, then, the processing circuitry 22 may be configured to determine the times known or estimated to coincide with the autonomous gaps created by the device 12, based on relating a radio link timing used in the serving cell 50-1 to a radio link timing used in the neighboring cell 50-2.

Further, the processing circuitry 22 is configured in one or more embodiments to obtain the repetition information for the neighboring cell 50-1 from another network node. For example, if the network node 10 is the eNB 52-1 seen in FIG. 2A, it may acquire the repetition information for the neighboring cell 50-2 from the eNB 52-2, or it may acquire the information from another node elsewhere in the network. Note, too, that the eNB 52-1 may perform such operations with respect to the cell 50-2 neighboring the cell 50-1, and the eNB 52-2 may perform such operations with respect to the cell 50-1 neighboring the cell 50-2. There also may be implementations where the same node 10 is responsible for both cells 50-1 and 50-2. See FIG. 2B for an example of that case, and see FIG. 2C for an example of the case where respective eNBs 52 managing respective neighboring cells 50 each operate as a node 10 for devices 12 being served from their respective cells 50. Broadly, any given node 10 may perform certain operations at certain times or for certain devices 12, for supporting serving-cell aspects of the teachings herein, and may perform certain other operations at other times or for other devices 12, for supporting neighbor-cell aspects of the teachings herein.

As a further possibility, information about the repetition level(s) used for transmitting SI in one or more neighboring cells 50 may be provisioned in or otherwise configured in a node 10. Correspondingly, in one or more embodiments, the processing circuitry 22 is configured to obtain the repetition information from configuration information 28 stored in the node 10, or stored in a location accessible to the node 10.

In another aspect of its operation, the processing circuitry 22 in one or more embodiments is configured to determine, based on the repetition level used for transmitting SI in the neighboring cell 50-2, a minimum number of acknowledgement messages that the device 12 must transmit in the serving cell 50-1 in response to receiving data from the serving cell 50-1 during acquisition by the device 12 of the SI of the neighboring cell 50-2.

Figure 3:
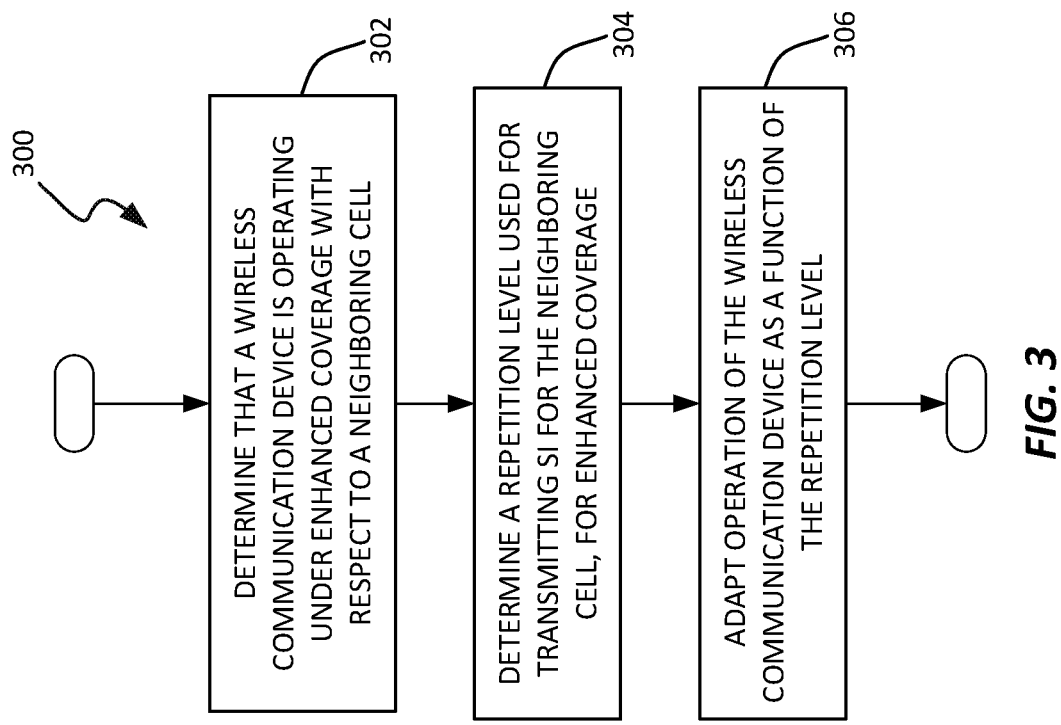
FIG. 3 is a logic flow diagram of one embodiment of a method of processing at a network node.

FIG. 3 illustrates a method 300 of operation at a node 10, and the method 300 includes determining (Block 302) that a device 12 is operating under enhanced coverage with respect to a neighboring cell 50-2, determining (Block 304)

a repetition level used for transmitting SI for the neighboring cell 50-2, for providing the enhanced coverage from the neighboring cell 50-2, and adapting (Block 306) operation of the device 12 as a function of the repetition level. The adapting includes adjusting at least one of the following to account for additional autonomous gaps needed by the device 12 to acquire the SI of the neighboring cell 50-2 while operating under the enhanced coverage with respect to the neighboring cell 50-2: a time at which the device 12 is scheduled in the serving cell 50-1 for data transmission or reception; and a time at which the device 12 is requested to acquire the SI of the neighboring cell 50-2.

Now consider complementary or corresponding configurations at the device 12. In one or more embodiments, the communication circuitry 30 of the device 12 is configured for operation in the network 40 and the processing circuitry 32 is operatively associated with the communication circuitry 30 and configured to carry out a number operations. In at least some embodiments, the processing circuitry 32 is configured to receive a request to acquire SI for a neighboring cell 50-2 that neighbors a serving cell 50-1 of the device 12. In the context of such operation, the device 12 is operating under enhanced coverage with respect to the neighboring cell 50-2, and the request to acquire the SI of the neighboring cell 52 may come from a node 10, or from a serving base station of the device 12, in cases where the node 10 is not part of the serving base station.

The processing circuitry 32 of the device 12 is further configured to determine a number of repetitions needed by the device 12 for acquiring the SI of the neighboring cell 50-2, where the repetitions in question are repeated transmissions of the SI for the neighboring cell 50-2. The processing circuitry 32 is further configured to configure a SI acquisition procedure to be performed by the device 12 to acquire the SI for the neighboring cell 50-2, in dependence on the determined number of repetitions. Such configuring includes configuring the number of autonomous gaps to be used by the device 12 for acquiring the SI for the neighboring cell 50-2.

The processing circuitry 32 in one or more embodiments is configured to determine the number of repetitions based at least in part on a repetition level used in the neighboring cell 50-2 for transmitting the SI, for providing the enhanced coverage. Further, in at least one embodiment, the processing circuitry 32 is configured to determine the number of repetitions based at least in part on a received signal level at the device 12 with respect to the neighboring cell 50-2. The processing circuitry 32 also is configured in one or more embodiments to determine a minimum number of acknowledgment/non-acknowledgment messages, ACK/NACKs, that must be sent from the device 12 for the serving cell 50-1 during the SI acquisition procedure, based at least in part on a repetition level used in the neighboring cell 50-2 for transmitting the SI, for providing the enhanced coverage.

Figure 4:
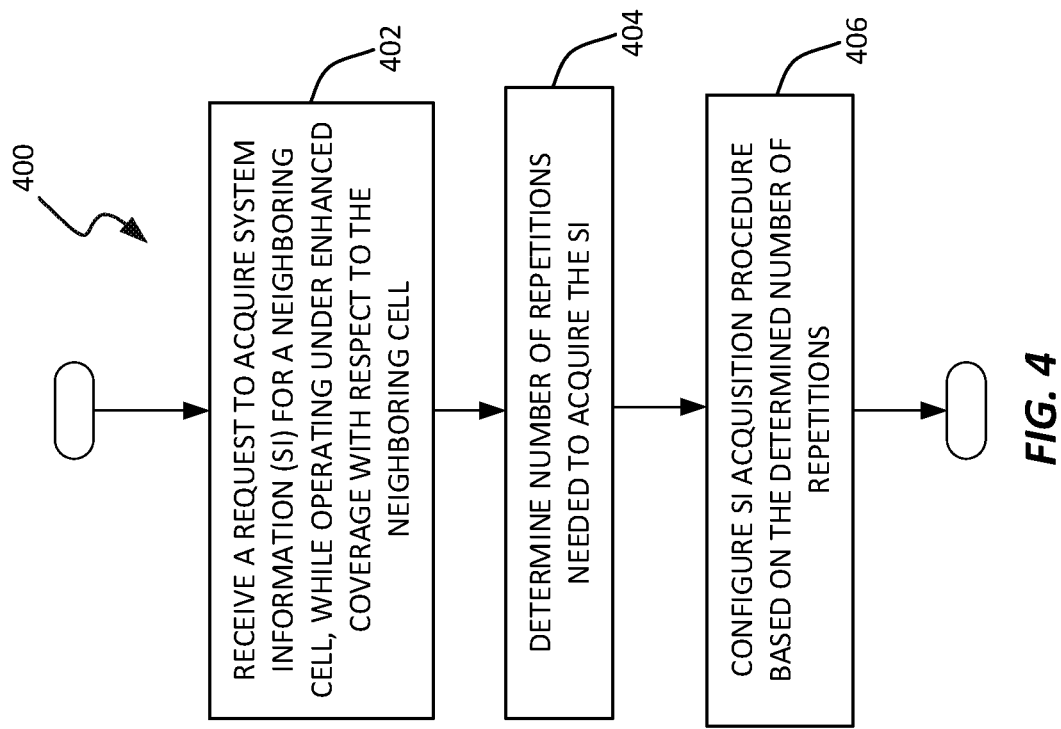
FIG. 4 is a logic flow diagram of one embodiment of a method of processing at a wireless communication device.

FIG. 4 illustrates a corresponding device-side method 400, which includes the device 12 receiving (Block 402) a request to acquire the SI for a neighboring cell 50-2 that neighbors a serving cell 50-1 of the device 12. In the context of these method operations, the device 12 will be understood to be operating under enhanced coverage with respect to the neighboring cell 50-2. Still further, the method 400 further include determining (Block 404) a number of repetitions needed by the device 12 for acquiring the SI of the neighboring cell 50-2, the repetitions being repeated transmissions of the SI for the neighboring cell 50-2. Still further, the method 400 includes configuring (Block 406) a SI acquisition procedure to be performed by the device 12 to acquire the SI for the neighboring cell 50-2. The device 12 configures the SI acquisition procedure in dependence on the determined number of repetitions, including configuring the number of autonomous gaps to be used by the device 12 for acquiring the SI for the neighboring cell 50-2.

As for the neighboring cell 50-2, there are further or other network-side operations contemplated herein. That is, a node 10 may perform the above network-side operations for or in the context of the serving cell 50-1, but the same node 10 may perform other operations when the cell 50-1 is the neighboring cell with respect to a device 12 being served in another cell, e.g., the cell 50-2. Consider an example scenario such as the one suggested in FIG. 2C, where one node 10-1/eNB 52-1 is associated with one cell 50-1 and another node 10-2/eNB 52-2 is associated with another cell 50-2. The node 10-1 may perform the earlier-described method 300 for a device 12 being served from its associated cell 50-1, and the node 10-2 may perform the below-described method 500 with respect to the same device 12 and the neighboring cell 50-2. Of course, the same node 10 may perform both method 300 and 500 at different times or for different devices 12.

The method 500 includes the node 10 determining (Block 502) that a device 12 is to acquire SI of a neighboring cell 50-2. That is, the device 12 is being served from a given cell 50, e.g., the cell 50-1 in the network 40, and it is going to acquire SI for a given neighboring cell 50, e.g., the cell 50-2. Here, one may assume that the node 10 being discussed is associated with the neighboring cell 50-2.

The method 500 further includes determining (Block 504) that the device 12 is operating under enhanced coverage with respect to the neighboring cell 50-2, determining (Block 506) a repetition level to be used for transmitting the SI for the neighboring cell 50-2, for providing the enhanced coverage from the neighboring cell 50-2, and transmitting (Block 508) the SI in the neighboring cell 50-2 with the determined repetition level. Here, the transmitting step (Block 508) may represent transmission of the SI by the node 10, or may represent the node 10 causing another node to perform the transmission.

In the context of the method 500 and, similarly, with respect to the method 300, the device 12 may be operating under normal coverage with respect to the serving cell 50-1, or may be operating under enhanced coverage with respect to the serving cell 50-1. In at least one contemplated scenario, the device 12 operates under normal coverage with respect to its serving cell(s) 50, and operates under enhanced coverage with respect to a neighboring cell 50 for which it is to acquire SI.

Further, in one or more embodiments, the step of determining (Block 502) that the device 12 is to acquire the SI of the neighboring cell 50-2 is based on receiving a message from another node in the network 40. Additionally, in one or more embodiments, the step of determining (Block 504) that the wireless communication device 12 is operating under enhanced coverage with respect to the neighboring cell 50-2 is based on receiving a message from another node in the network 40.

In another example embodiment corresponding to the above-described method 500, the processing circuitry 22 of a node 10 may be configured to determine that a device 12 is to acquire the SI of a neighboring cell 50-2, and determine that the device 12 is operating under enhanced coverage with respect to the neighboring cell 50-2. The processing circuitry 22 is further configured to determine a repetition level to be used for transmitting the SI for the neighboring cell 50-2, for providing the enhanced coverage from the neighboring cell 50-2, and transmit the SI in the neighboring cell 50-2 with the determined repetition level.

In some embodiments, the device 12, also referred to as a UE, may be configured with a Primary Cell, PCell, and a Primary Secondary Cell, PSCell, or with a PCell, a PSCell and one or more Secondary Cells, SCells, such as are used in dual connectivity and/or carrier aggregation configurations. The configured cells are device-specific and in such cases the device 12 may have multiple serving cells. Here, for simplicity, the reference number "50" is dropped, for generalized discussion of cells without specific reference to the example cell arrangement seen in FIG. 2.

In general, the device 12 is served by a serving cell that has already been identified by the device 12. The device 12 further identifies at least one another cell, which may be called a target cell or neighbor cell. In some embodiments, the serving cell and neighbor cell are served or managed by a first node 10-1 and a second node 10-1, respectively. In other embodiments, the serving cell and neighbor cell are served or managed by the same node 10.

The embodiments are applicable for a device 12 in a low or in high activity state. Examples of a low activity state are the Radio Resource Configuration, RRC, idle state, idle mode, etc. Examples of a high activity state are RRC CONNECTED state, active mode, active state, etc. The device 12 may be configured to operate in Discontinuous Reception, DRX, or in non-DRX. If configured to operate in DRX, the device 12 may still operate according to non-DRX as long as it receives new transmissions from the network 40.

The device 12 may operate under either normal coverage or enhanced coverage with respect to its serving cell. The enhanced coverage is also interchangeably called extended coverage. The device 12 may also operate in a plurality of coverage levels, e.g. normal coverage, enhanced coverage level 1, enhanced coverage level 2, enhanced coverage level 3 and so on. The different levels of enhanced coverage correspond to, for example, different ranges of received signal level, and may be referred to as CE1, CE2, and so on.

The normal and extended coverage operations may take place on narrower radio frequency, RF, bandwidth, as compared with the system or cell bandwidth that is used or otherwise available for operation under normal coverage. In some embodiments, the RF BW can be the same as of the system bandwidth. Examples of narrow RF BWs are 200 KHz, 1.4 MHz, etc. Examples of system BWs are 200 KHz, 1.4 MHz, 3 MHz, 5 MHz, 10, MHz, 15 MHz, 20 MHz etc. In case of extended/enhanced coverage, the device 12 may be capable of operating under lower signal quality level, e.g. lower Signal-to-Noise Ratio, SNR, Signal-to-Noise-and-Interference Ratio, SINR, lower average received signal energy per subcarrier to total received power per subcarrier, $\hat{E}s/Iot$, lower Reference Signal Received Quality, RSRQ, etc. Here, the word "lower" denotes lower in comparison to the levels or values associated with normal coverage operation. The coverage level enhancement may vary with the operational scenario and may also depend on the device type. For example, a device 12 that is located in a basement with bad coverage may need more coverage enhancement than a device 12 that is simply located at or near the border of the involved cell.

Here, "more" enhancement means that the device 12 operates at even lower signal levels with respect to the network 40, and the network 40 may correspondingly use higher repetitions to provide coverage to devices 12 operating at those lower levels. Also, note that the above-used notation of $\hat{E}s/Iot$ is defined in the LTE context as the ratio of $\hat{E}s$, which is the received energy at the device's antenna connector per resource element or RE, where the power is normalized to the subcarrier spacing during the useful part of the symbol, i.e. excluding the cyclic prefix. The term Iot is defined as the received power spectral density of the total noise and interference for a certain RE, with the power integrated over the RE and normalized to the subcarrier spacing. It will be appreciated that a RE represents a particular subcarrier at a particular time instant, as defined by the time-frequency grid associated with Orthogonal Frequency Division Multiplexing or OFDM.

In one example of enhanced coverage conditions, a first level of enhanced coverage, denoted as Coverage Enhancement 1 or CE1, the device 12 operates at a SNR less than or equal to −6 dB with respect to the enhanced-coverage cell in question. A further level, denoted as CE2, involves the device 12 operating at a SNR of −12 dB≤SNR<−6 dB with respect to the enhanced-coverage cell. Further examples of coverage enhancement levels include CE3, defined as −15 dB≤SNR<−12 dB at the device 12 with respect to the enhanced-coverage cell, and CE4, defined as −18 dB≤SNR<−15 dB at device 12 with respect to the enhanced-coverage cell.

As noted before, the device 12 may operate under normal coverage with respect to its serving cell but operate under enhanced coverage with respect to a neighboring cell. In other words, signal levels associated with the neighboring cell fall into an enhanced-coverage range and the device 12 generally will need to receive repeated SI transmissions for successful reception.

Consider an example where a device 12 is configured to acquire the SI of a target cell, which for purposes of this example can be assumed to be a neighbor cell and the device 12 can be assumed to be operating under enhanced coverage with respect to the neighboring cell. The contemplated SI acquisition may be acquisition of an E-UTRA CGI. The node 10, or the serving base station of the device 12 if the node 10 is not the serving base station, may configure the device 12 to acquire the target-cell SI, and it may trigger that configuration in support of cell change, automatic neighbor relation, ANR, determination, network planning or tuning, etc. Here, the node 10 or the involved base station may determine whether the device 12 is operating under enhanced coverage with respect to the target cell based on any one or more of: radio measurement results, the device mobility profile, device location information, and device capability. For example, the node 10 may obtain device radio measurements such as Reference Signal Received Power, RSRP, or RSRQ, or SINR or SNR, with respect to the target cell. Additionally, or alternatively, the node 10 may determine its assessment of the coverage mode of the device 12 based on measurements of uplink signals from the device 12.

The node 10 may use the device mobility profile to determine the coverage mode of the device in an area of the network. The device mobility profile is characterized by one or more of: device speed or velocity such as Doppler speed, device direction of movement, device acceleration, device trajectory, etc. For example, based on device direction of motion and speed, the node 10 may predict the device coverage at a certain time in future. The node 10 may determine the device mobility profile based measurements of uplink signals from the device 12.

The node 10 may also obtain the device location information and use it to determine the coverage mode of the device 12 for a given cell or area in the network 40. The location of the device 12 can be determined based on one or a combination of location methods, such as the Global Navigation Satellite System, GNSS, or Assisted GNSS, A-GSNN, enhanced cell ID, time of arrival, TOA, of signals, observed time difference of arrival, OTDOA, etc. The device location may also be obtained by paging the device 12, e.g., when it is in IDLE state. The location information may comprise a geographical and/or a logical location, e.g., location coordinates, device proximity to an object with a known location, device location in a cell or in a cell portion, location within a tracking area, etc.

The node 10 may also obtain the device capability information that indicates whether the device 12 supports enhanced-coverage operation. Such information may indicate that the device 12 is capable of operating under one or more ranges of enhanced coverage. The device capability information can be obtained from the device 12 and/or from another node that knows the device capability. For example, if the device capability information indicates that the device 12 is capable of operating under enhanced coverage and the device 12 is also physically operating under enhanced coverage, e.g. SINR=−10 dB, then the node 10 may consider the device 12 as operating under the enhanced coverage mode with respect to the involved cell(s) of the network 40.

The node 10 may also continuously or regularly monitor the coverage level of a device 12 in the relevant area(s) of the network 40 by using one or more criteria mentioned above. Monitoring enables the node 10 to know any change in the coverage level of the device 12 with respect to its serving cell or cells and/or with respect to any neighboring cells.

In one or more embodiments, the node 10 obtains information related to the signal transmission configuration(s) in use for a neighboring cell. Particularly, the node 10 may obtain information indicating the repetition level(s) used for a neighboring cell for the repetition of one or more items of SI transmitted for the neighboring cell, or the node 10 obtains information from which the repetition level(s) can be derived. Here, a "repetition" means a repeated transmission, e.g., multiple transmissions of the same signal or copies of the signal, where repetition may be performed in the time domain, in the frequency domain, or in both the time and frequency domains. Repeating the same information multiple times effectively increases the link budget and allows a device 12 operating under enhanced coverage with respect to the cell in question to successfully receive the information being repeated, based on averaging, accumulating, aggregating, or other processing the multiple receptions of the repeated transmission.

Of course, as mentioned elsewhere herein, the device 12 creates autonomous gaps for receiving the repeated transmissions, or for receiving at least some of them, with those gaps interrupting operation of the device 12 with respect to its serving cell(s). Thus, in the context of the node 10 obtaining information about the repetition level associated with a target cell for which the device 12 is to obtain SI, the node 10 may decide to adapt the scheduling pattern and/or SI acquisition procedure for the device 12. For example, the scheduling information may indicate in which of the upcoming subframes the node 10—or another node in the network 40—is going to schedule the device 12. For example, the information indicates that the device 12 is going to be scheduled for downlink data transmission, e.g., on a Physical Shared Downlink Channel or PDSCH, over the following four subframes: n+4, n+5, n+6, and n+7.

Adapting the operation of the device 12 in this context means adapting the initially planned scheduling pattern. In one example, the scheduling pattern is adapted to defer or move scheduled transmissions to account for the additional time needed by the device 12 to acquire SI from a cell for which the device 12 operates under enhanced coverage. In a related example, which may be practiced jointly or separately, the operation of the device 12 is adapted by limiting the number or amount of radio resources allocated to the device 12. For example, scheduling in the serving cell may limit resource allocation to, e.g., twenty subframes, during a time when the device 12 is to acquire the SI of a cell with respect to which the device 12 operates under enhanced coverage. Additionally, or alternatively, the adaptation involves deferring or otherwise changing when the device 12 is asked to acquire SI for the cell, to avoid having the SI acquisition procedure interfere with scheduling transmissions to or from the device 12 in a serving cell of the device 12.

In further examples of contemplated operation, the node 10 may directly or indirectly provide the device 12 with information about any operational adaptations undertaken for the device 12. For example, information about scheduling adaptations may be provided to the device 12, such as informing the device 12 in advance as to whether the device 12 is scheduled for data transmission or reception during a time in which the device 12 is to acquire the SI of a cell with respect to which the device 12 is operating under enhanced coverage.

As for determining whether or to what extent the device's SI acquisition procedure will interfere with any scheduled transmissions planned for the device 12, the node 10 may evaluate the times, e.g., subframes, during which the device 12 is to acquire the SI, and compare those times with the planned scheduling instances. The times implicated by the SI acquisition procedure may be known to the node 10, for example, from information included in the SI acquisition request sent, or to be sent, from the network 40 to the device 12, to request that the device 12 acquire the SI of a cell with respect to which the device 12 is operating under enhanced coverage.

The comparison or "interference" evaluation may also consider the repetition level known or estimated for transmitting the SI in the involved cell, with higher repetition levels generally interpreted as corresponding to more autonomous measurement gaps being used at the device 12. Additionally, the assessment of whether the SI acquisition will interfere with planned scheduled transmissions involving the device 12 may consider received signal levels at the device 12 for the involved cell, with higher signal levels generally interpreted as corresponding to the device 12 needing fewer repetitions for successful SI acquisition. For example, although the involved cell may use a given level or number of repetitions for SI transmissions, the device 12 may receive the cell's signals at higher or lower levels within the range of signal level constituting the enhanced coverage range. Higher signal levels may be interpreted by the node 10 as meaning that the device 12 will need fewer repetitions for successful SI acquisition.

While more sophistication is contemplated, the above details can be summarized as disclosing that in one or more embodiments, the node 10 adapts the operation of the device 12 by delaying the contemplated SI acquisition procedure so that it does not collide with scheduled transmissions to or from the device 12. Alternatively, the node 10 delays or otherwise reschedules one or more data transmissions to or from the device 12, to avoid colliding with the SI acquisition procedure performed by the device 12—i.e., avoid scheduling the device 12 at times corresponding to the autonomous measurement gaps created at the device 12 for acquiring the repeated SI transmissions. It may be that, given any number of considerations, the node 10 in one instance decides to defer the SI acquisition to avoid interfering with scheduled transmissions, while in another instance the node 10 decides to adapt the scheduling in favor of allowing the device 12 to proceed with the SI acquisition procedure.

Also, as explained earlier, there may be different levels of coverage enhancements. As an example, coverage enhancement levels 1-2 could be interpreted as moderate extensions while coverage enhancement levels 3-4 could be interpreted as extreme extensions. The level of coverage extension affects the levels of repetitions. The extreme coverage extensions may require large numbers of repetitions while moderate coverage extensions may require no or very little repetition. By considering the level of coverage extension at issue and the corresponding number of repetitions when deciding whether or how to adapt operation of the device 12, the node 10 may provide the network 40 with further improvements in radio resource utilization efficiency.

In an example case, the node 10 determines that the device 12 is operating under enhanced coverage with respect to a given neighboring cell. However, the node 10 conditions its adaptation of the device's operation in dependence on the involved level of coverage enhancement. For example, if the device 12 is operating at a first level of coverage enhancement involving a first range of signal levels below the "normal" level, it may be that the device 12 can successfully acquire the SI of the cell without needing any repetitions, or with needing only a few repetitions. Consequently, despite the device 12 operating under enhanced coverage towards the neighboring cell, the node 10 does not adapt the device's operation as described above. In another case, however, where the device 12 is operating in a more extreme enhanced coverage range, i.e., one involving signal levels well below the range of normal operation and generally requiring high levels of repetition for successful reception, the node 10 adapts the operation of the device 12—i.e., it changes when the device 12 performs the SI acquisition for the neighboring cell or it changes transmission scheduling for the device 12, to avoid collisions between the SI acquisition procedure and scheduled transmissions.

To better understand the relationship between varying levels of enhanced-coverage operation and corresponding signal repetition levels, consider that enhanced-coverage operation in an example case considers operation at, e.g., signal levels in the −15 dB SINR range. At those low levels, large numbers of repetitions typically are needed for successful reception in the uplink and in the downlink. At such SINR levels, the following repetition levels may be assumed: M-PDCCH repetition of 128, PDSCH repetition of 64, and PUCCH repetition of 32. Here, "M-PDCCH" denotes MTC Physical Downlink Control Channel, "PDSCH" denotes, as noted before, the Physical Downlink Shared Channel, and "PUCCH" denotes the Physical Uplink Control Channel. These examples come from the LTE context but should not be considered limiting, as other network types may define their own channels to which repetition is applied for enhanced coverage.

The repetitions also include the transmission of HARQ feedback. For example, a device 12 receives M-PDCCH transmissions in the first 128 subframes, followed by PDSCH transmission in the next 64 subframes. The HARQ feedback is then transmitted in the subsequent 32 subframes. This means that in total 192 subframes may be needed to receive downlink data for one subframe in bad radio conditions, i.e. at low SINR of −15 dB. In this context, the device 12 is allowed to acquire the enhanced CGI, ECGI, within 190 ms in total i.e., it may take up to 190 ms to read the MIB and SIB1, or SIB ibis for eMTC, of the neighboring cell. This timing means that if the device 12 creates autonomous gaps within this period, data transmissions to or from the device 12 will be affected. Consequently, the affected data transmissions will not be completed in time and, if the collisions are permitted, the ECGI reading will not be completed in time. According to the teachings herein, in such a case, the node 10 will defer the SI acquisition procedure—e.g., by controlling when the device 12 is requested to acquire the SI—or adjust the scheduling plan so that scheduled transmissions are deferred or otherwise moved to avoid colliding with the SI acquisition procedure.

In at least one embodiment, the device 12 may decide to delay a requested SI acquisition procedure, e.g., based on determining that it is operating under enhanced coverage with respect to the cell from which it is to acquire the SI, obtaining information related to scheduling of data transmissions involving the device 12, determining whether the SI acquisition procedure will collide with a scheduled transmission, and deciding whether to proceed with or delay the requested SI acquisition procedure, based on the collision assessment. For example, the device 12 may delay the SI acquisition procedure for a certain time, T0. In another example, if uplink data scheduling and the transmission of SI acquisition results would occur in the same radio resources, the device 12 may choose to delay the uplink data transmission. Delaying the uplink data transmission enables the device 12 to send the SI acquisition results.

A device 12 may assess whether it is operating under enhanced coverage with respect to a given neighboring cell based on making one or more radio measurements, such as RSRP, RSRQ, SINR, SNR, etc. In an example configuration, if the RSRQ measured by the device 12 towards a given cell is below a defined threshold, then the device 12 concludes that it is operating under enhanced coverage with respect to the cell. Additionally, or alternatively, the device 12 may receive signaling from the node 10 or from another node in the network 40, that indicates whether the device 12 is operating under enhanced coverage with respect to a cell, or provides the device 12 with information enabling the device 12 to make such a determination. For example, the network 40 may use RRC-based signaling to provide the device 12 with such information.

The device 12 could also derive such information based on, for example, a transmitted signal pattern. If the device 12 discovers that the signals are repeated by at least certain number of times in a cell, then the device 12 may interpret such signal repetition pattern as an indication that it is operating under coverage extension with respect to the cell. Alternatively, the device 12 may receive signaling from the network 40 that indicates relevant configuration information for the cell in question, e.g., the repetition level(s) used in the cell. Such signaling may comprise a parameter K that indicates the repetition level and/or the signaling may indicate a coverage-enhancement level, which the device 12 may then translate or map to a defined repetition level.

Also, as described with respect to network-side operations, whether or to what extent the device 12 decides to alter its operation to avoid collision between scheduled data transmissions and a requested SI acquisition may depend on the coverage-enhancement level in play. At a first level of coverage enhancement involving signal levels nearest to those associated with normal coverage, the device 12 may not make any adjustments. However, at further, more extreme levels of coverage enhancement involving signal levels substantially below the normal range, e.g., more than −10 dB down, the device 12 may defer a requested SI acquisition procedure to avoid interrupting scheduled transmissions.

To ensure well defined behavior by devices 12, certain rules may be defined. As a first example rule, a device 12 is not required to receive or transmit data to a serving cell while performing a SI acquisition procedure towards a target cell, for at least some levels of coverage enhancement, e.g., as defined by one or more thresholds of coverage enhancement. In another example, the device 12 may operate according to a rule wherein the device 12 is not required to receive or transmit data in a serving cell provided that the coverage-enhancement level with respect to a cell for which the device 12 is to acquire SI is beyond some defined threshold.

In instances involving rules where the device 12 is required to support data transmissions to or from the device 12 in a serving cell during the device's acquisition of SI from a target cell involving enhanced coverage operation of the device 12, the device 12 may be required to send a certain number of acknowledgements or non-acknowledgments, ACK/NACKs in the uplink, when operating under a continuous downlink data allocation in the serving cell. Example coverage-enhancement thresholds having different minimum ACK/NACK transmission requirements are seen in the table of FIG. 6. In this case, the first SNR condition, SNR of serving cell≥−6 dB, may correspond to a coverage-enhancement "mode A" and the latter case, SNR of serving cell<−6 dB, may correspond to a coverage-enhancement "mode B".

This example assumes a repetition level of four for MIB and SIB1 transmission in the target cell, and it shall be understood that similar arrangements may be used for more than two coverage-enhancement levels, e.g., levels 1-4, where level 1 represents normal coverage and levels 2-3 represent increasingly extreme levels of enhanced coverage. See the corresponding example table of FIG. 7.

For a case where no repetition is used for the PDSCH in the device's primary cell or PCell, the device 12 in at least some embodiments shall be configured such that it sends some minimum number of ACK/NACKs to the serving cell while performing the SI acquisition procedure towards a target cell involving enhanced coverage. For example, the device 12 may comply with a defined requirement that specifies the minimum number of ACK/NACKs the device 12 is to send in the serving cell while performing a 190 ms CGI acquisition procedure. The minimum number of ACK/NACKs depends on the duplex mode and configuration of the serving cell as well as on the duplex mode of the target cell.

Figure 8:
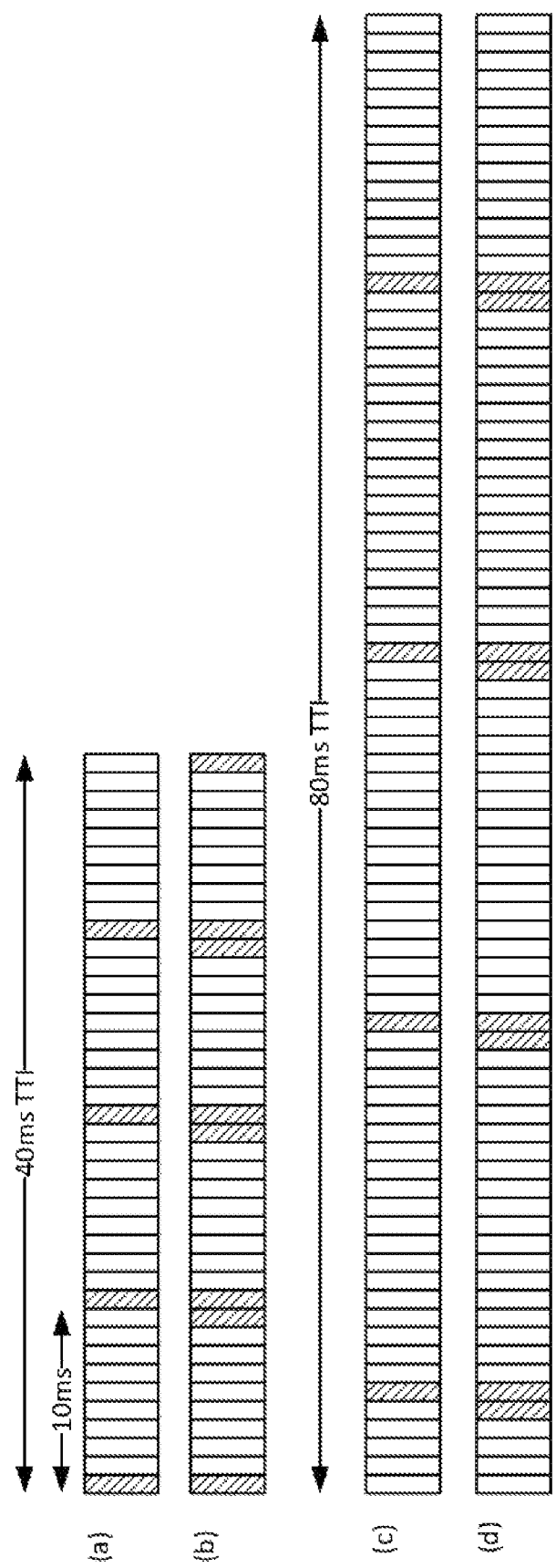
FIG. 8 is a diagram illustrating MIB transmission without and with repetition and SIB1 transmission with and without repetition.

The device 12 may assume that repetition is used in the target cell and may apply puncturing correspondingly. MIB and SIB1 with and without repetition in subframe 9 and every second subframe 4, respectively, are illustrated in FIG. 8. The figure assumes Frequency Division Duplex, FDD, operation for the involved target cell. Row (a) shows regular MIB transmission in the target cell without repetition, i.e., for normal coverage. Row (b) illustrates MIB repetition of two. Rows (c) and (d) illustrate SIB transmission in the target cell, for the case of no repetition and with repetition of two, respectively. In this regard, the shaded subframes will be understood as indicating the transmission instances of MIB or SIB. Legacy or normal-coverage operation assumes that the device 12 needs to puncture four subframes of the serving cell for each target-cell subframe carrying MIB or SIB1. Here, "puncturing" means the imposition of a reading gap by the device 12. Therefore, when not one but two adjacent subframes in the target cell are carrying MIB or SIB1 the device 12 will puncture one additional subframe for reception of each extra transmission.

Further, additional gaps are allowed for the device 12 to perform a gain search at the beginning of the SI acquisition procedure. However, because MTC systems, at least in the first 3GPP releases, operate over the minimum bandwidth, there is no need for bandwidth reconfiguration and associated gain search after the MIB acquisition. An exemplary puncturing pattern and associated minimum number of ACK/NACKs for a FDD target cell and a FDD or TDD serving cell is illustrated in FIG. 9. The table considers possible radio link timing offsets between the involved serving and target cells, and applies to FDD or TDD operation in the serving cell with FDD operation in the target cell, with assumed levels of repetition of MIB and SIB1 in the target cell. For clarity, FDD denotes Frequency Division Duplex and TDD denotes Time Division Duplex. The illustrated subframe patterns indicate presence of a gap with respect to the serving cell by (1) and the absence of a gap by (0). Again, the gaps in question here represent the gaps imposed by the device 12 for SI acquisition towards the target cell.

In one or more example embodiments, when continuously scheduled on the downlink in a serving cell, the device 12 shall send the minimum number of ACK/NACKs as stipulated in the table depicted in FIG. 9. A corresponding table may easily be derived for the case when the target cell is a TDD cell, rather than a FDD cell. The repetitions in the target cell are not mandatory, hence the device 12 detects or hypothesizes whether repetition is used or not. In case the device 12 fails to acquire the CGI of the target cell before a timer, e.g., timer T321 as defined in the relevant LTE specification, expires after 190 ms plus a 15 ms RRC procedure delay, the device 12 reports to the network 40 that no cell was found; otherwise it reports the CGI of the target cell. See Section 7.3 of the 3GPP Technical Specification TS 36.331 V13.0.0 for details regarding T321.

Now consider a specific application of the teachings herein to a device 12 that is configured as a Category M1 UE according to the relevant 3GPP standards such as TS 36.133, and is operating under coverage enhancement, CE, Mode B with respect to a target cell, and is to perform E-UTRAN FDD intra frequency measurements for the target cell using autonomous measurement gaps. The following assumptions apply: transmit diversity or transmission using multiple antennas are supported in the target cell to be detected, and repetitions of MIB/SIB ibis are supported in the target cell to be detected.

For identification of a CGI of a E-UTRA cell using autonomous gaps created by the device 12, no explicit neighbor list is provided to the device 12 for identifying the new CGI. The device 12 shall identify and report the CGI when requested by the network for the purpose "reportCGI". The device 12 may make autonomous gaps in downlink reception and uplink transmission in the serving cell in relation to receiving MIB and SIB1 bis messages in the target cell, according to clause 5.5.3.1 of the 3GPP Technical Specification identified as TS 36.331. Note that a device 12 is not required to use autonomous gap if si-RequestForHO is set to false. If autonomous gaps are used for measurement with the purpose of "reportCGI", regardless of whether DRX is used or not, or whether SCell(s) are configured or not, the device 12 shall be able to identify a new CGI of a E-UTRA cell within:

$$T_{identify\_CGI\_Cat\ M1, intra} = T_{basic\_identify\_CGI\_Cat\ M1, intra} \text{ms}$$

Where Tbasic_identify_CGI_Cat M1, intra=190 ms. This is the time period used in the above equation where the maximum allowed time for the device 12 to identify a new CGI of an E-UTRA cell is defined, provided that the E-UTRA cell has been already identified by the device 12. A cell shall be considered identifiable where following conditions are fulfilled: RSRP related side conditions given in TS 36.133 are fulfilled for a corresponding Band, and SCH_RP and SCH Ês/Iot for a corresponding Band.

The MIB of an E-UTRA cell whose CGI is identified shall be considered decodable by the device 12 provided certain Physical Broadcast Channel demodulation requirements are met.

The requirement for identifying a new CGI of an E-UTRA cell within Tbasic_identify_CGI_Cat M1, intra is applicable when no DRX is used as well as when all the DRX cycles specified in TS 36.331 are used. Within the time, $T_{identify\_CGI\_Cat\ M1,intra}$ ms, over which the device 12 identifies the new CGI of E-UTRA cell, the device 12 shall transmit at least the number of ACK/NACKs on the PCell as shown in FIG. 10, provided that: there is a continuous downlink data allocation, no DRX cycle is used, no measurement gaps are configured by the network 40, only one code word is transmitted in each subframe, and no MBSFN subframes are configured in the PCell or each of the device's activated SCell(s).

Also, note that an ECGI reporting delay occurs due to the delay uncertainty when inserting the ECGI measurement report to the TTI of the uplink DCCH. The delay uncertainty is twice the TTI of the uplink DCCH. In case DRX is used, the ECGI reporting may be delayed until the next DRX cycle. If In-Device-Coexistence, IDC, autonomous denial is configured, an additional delay can be expected.

]Now consider E-UTRAN intra frequency measurements with autonomous gaps for HD-FDD UE category M1 with CE mode B. For a device 12 that supports half duplex FDD operation on one or more supported frequency bands, certain requirements must be met by the device 12 assuming the following conditions apply: transmit diversity or transmission using multiple antennas are supported in the target cell to be detected, and repetitions of MIB/SIB1 bis are supported in the target cell to be detected.

All requirements discussed immediately above for a Category M1 device operating under CE Mode B with respect to a target cell apply, except that there shall be no requirement in terms of the minimum number of ACK/NACKs that the device 12 must transmit on the PCell, for a device 12 operating with half-duplex FDD. In general, it may not be relevant to define requirements for the minimum ACK/NACK transmissions required from the device 12 in the serving cell for cases where repetitions are employed in the serving cell, i.e. SNR<−6 dB in the serving cell with respect to the device 12. However, when no PDSCH repetition is employed in the serving cell, the device 12 shall be capable of sending a minimum number of ACK/NACKs to the serving cell, or involved test equipment, during the contemplated 190 ms CGI acquisition period used by the device 12 for acquiring the CGI of a neighbor cell with respect to which the device 12 is operating under enhanced coverage. The minimum number of ACK/NACKs that the device 12 is required to send in the serving cell depends on the duplex mode and configuration of the serving cell as well as on the duplex mode of the target cell.

The device 12 may assume that repetition is used in the target cell and may apply puncturing in the serving cell correspondingly. MIB and SIB ibis with and without repetition in subframe 9 and every second subframe 4, respectively, were illustrated in FIG. 8. For legacy LTE systems, it was assumed that the device 12 needed to puncture 4 subframes of the serving cell for each target cell subframe carrying MIB or SIB1. Therefore, when the target cell transmits MIB and SIB1 with repetition, the device 12 will apply additional puncturing with respect to the serving cell, to receive the additional transmissions. Further, there is, similar to legacy operation, additional gaps allowed for gain search at the beginning of the acquisition. Since MTC systems operate over the minimum bandwidth there is no need for bandwidth reconfiguration and associated gain search after the MIB acquisition.

An exemplary puncturing pattern and associated minimum number of ACK/NACKs for FDD target cell and FDD or TDD serving cell was depicted in the table of FIG. 9. When continuously scheduled on the downlink, the device 12 shall send the minimum number of ACK/NACKs as shown in the table of FIG. 9. A corresponding table may easily be derived for the case when the target cell is a TDD cell. The repetitions in the target cell are not mandatory, hence the device 12 detects or hypothesizes whether repetition is used or not. In case the device 12 fails to acquire the CGI before a timer, e.g., timer T321, expires after the 190 ms acquisition time plus a 15 ms RRC procedure delay, the device 12 reports to the network 40 that no cell was found; otherwise it reports the CGI of the target cell.

With the above in mind, in an example case, a device 12 operates as a MTC device and reports to its serving cell when it detects that the received power level for a neighboring cell exceeds a defined threshold. The serving cell may then send a request to the device 12 to read the SI of the neighboring cell. However, in instances where the device 12 is operating under enhanced coverage with respect to the neighboring cell, it may need to receive multiple repetitions of the MIB and SIB1, as transmitted in the neighboring cell, and the SI acquisition procedure is, therefore, extended. Correspondingly, a node 10 and/or the device 12 may decide to defer the SI acquisition procedure, e.g., based on determining that the SI acquisition procedure will collide with one or more scheduled data transmissions to or from the device 12 in the serving cell.

The device 12 may communicate with the serving cell by receiving M-PDCCH and PDSCH transmissions from the serving cell and by transmitting PUCCH and PUSCH to the serving cell. When device 12 reports to the serving cell that the neighboring-cell power is above a threshold, the serving cell sends a request to device 12 to obtain the CGI for the neighboring cell. Then device 12 start to receive PBCH and SIB ibis for the neighboring cell. As taught herein, however, the SI acquisition towards the serving cell may be performed selectively, or at least deferred in dependence on whether it will collide with one or more scheduled data transmissions to or from the device in the serving cell.

Such teachings are applicable to single carrier as well as to multicarrier or carrier aggregation operation of the device 12, in which the device 12 receives and/or transmits data to more than one serving cell. The term carrier aggregation or CA also may be referred to as "multi-carrier system", "multi-cell operation", "multi-carrier operation", or "multi-carrier" transmission and/or reception. In CA, one of the component carriers or CCs is the primary component carrier, PCC, or simply primary carrier or anchor carrier. The remaining ones are called secondary component carriers or SCCs, or simply secondary carriers or supplementary carriers. The serving cell is interchangeably called the primary cell, PCell, or the primary serving cell PSC. Similarly, each secondary serving cell is interchangeably called a secondary cell, SCell, or a secondary serving cell, SSC. Moreover, the teachings herein are applicable to dual connectivity, DC, operation, where the device 12 is simultaneously connected to at least two serving cells, a PCell and a Primary Secondary cell, PSCell, and potentially to one or more SCells that are under either or both of the PCell and the PSCell. And, as noted, the teachings herein have applicability beyond the example LTE context used for ease of description, and may be applied to many other RATs, such as LTE FDD/TDD, WCDMA/HSPA, GSM/GERAN, Wi Fi, WLAN, CDMA2000, etc.

One or more embodiments of the method disclosed herein provide for efficient use of radio resources in a mixture of eNode B, and UEs. A UE will not create unnecessary autonomous gaps that cause interruptions to other scheduled transmissions in downlink. The method(s) enable data transmissions to take place much faster and in scheduled subframes, i.e. it avoids delays in instances where SI acquisition will not collide with scheduled transmissions. The methods enable a UE to report acquired SI without delays in cases where such reporting will not interfere with scheduled transmissions.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a network node of a wireless communication network, the network node managing a serving cell serving a wireless communication device, the method comprising:
    determining that the wireless communication device is operating under enhanced coverage with respect to a neighboring cell of the wireless communication network, the neighboring cell being neighbor to the serving cell;
    determining a repetition level used for transmitting System Information (SI) for the neighboring cell, for providing the enhanced coverage from the neighboring cell; and
    adapting operation of the wireless communication device as a function of the repetition level, including adjusting at least one of the following to account for additional autonomous gaps needed by the wireless communication device to acquire the SI of the neighboring cell while operating under the enhanced coverage with respect to the neighboring cell:
        a time at which the wireless communication device is scheduled in the serving cell for data transmission or reception; and
        a time at which the wireless communication device is requested to acquire the SI of the neighboring cell.

2. A method of operation in a wireless communication device, the method comprising:
    receiving a request to acquire System Information (SI) for a neighboring cell that neighbors a serving cell of the wireless communication device, wherein the serving and neighboring cells are included in a wireless communication network and the wireless communication device is operating under enhanced coverage with respect to the neighboring cell;
    determining a number of repetitions needed by the wireless communication device for acquiring the SI of the neighboring cell, the repetitions being repeated transmissions of the SI for the neighboring cell; and
    configuring a SI acquisition procedure to be performed by the wireless communication device to acquire the SI for the neighboring cell, in dependence on the number of repetitions, including configuring a number of autonomous gaps to be used for acquiring the SI for the neighboring cell.

3. The method of claim 2, wherein determining the number of repetitions comprises determining the number of repetitions based at least in part on one of: a repetition level used in the neighboring cell for transmitting the SI, for providing the enhanced coverage; and a received signal level at the wireless communication device with respect to the neighboring cell.

4. A method of operation at a network node of a wireless communication network, the method comprising:
    determining that a wireless communication device is to acquire System Information (SI) of a neighboring cell that neighbors a serving cell of the wireless communication device, wherein the serving and neighboring cells are included in a wireless communication network;
    determining that the wireless communication device is operating under enhanced coverage with respect to the neighboring cell;
    determining a repetition level to be used for transmitting the SI for the neighboring cell, for providing the enhanced coverage from the neighboring cell, wherein at least one of a time at which the wireless communication device is scheduled in the serving cell for data transmission or reception and a time at which the wireless communication device is requested to acquire the SI of the neighboring cell is adjusted to account for additional autonomous gaps as a function of the repetition; and
    transmitting the SI in the neighboring cell with the determined repetition level.

5. A network node configured for operation in a wireless communication network and for managing a serving cell serving at least one wireless communication device, the network node comprising:
    communication circuitry configured for communicating with the at least one wireless communication device operating in the wireless communication network and one or more other network nodes in the wireless communication network; and
    processing circuitry operatively associated with the communication circuitry and configured to:
        determine that a wireless communication device is operating under enhanced coverage with respect to a neighboring cell of the wireless communication network, the neighboring cell being neighbor to the serving cell;
        determine a repetition level used for transmitting System Information (SI) for the neighboring cell, for providing the enhanced coverage from the neighboring cell; and
        adapt operation of the wireless communication device as a function of the repetition level, including adjusting at least one of the following to account for additional autonomous gaps needed by the wireless communication device to acquire the SI of the neighboring cell while operating under the enhanced coverage with respect to the neighboring cell:
- a time at which the wireless communication device is scheduled in the serving cell for data transmission or reception; and
- a time at which the wireless communication device is requested to acquire the SI of the neighboring cell.

6. The network node of claim 5, wherein the processing circuitry is configured to adapt the operation of the wireless communication device as a function of the repetition level by adapting the operation responsive to the repetition level exceeding a defined threshold or value, and otherwise not adapting the operation.

7. The network node of claim 5, wherein the processing circuitry is configured to adapt the operation of the wireless communication device as a function of the repetition level by:
- estimating, based on the repetition level, whether an SI acquisition procedure to be performed by the wireless communication device with respect to the neighboring cell will interfere with a scheduled data transmission to or from the wireless communication device in the serving cell; and
- responsive to an interference estimation, rescheduling the data transmission to avoid being interfered with by the SI acquisition procedure, or delaying the SI acquisition procedure to avoid interfering with the scheduled data transmission.

8. The network node of claim 7, wherein the processing circuitry is configured to base the estimating further on received signal levels reported by the wireless communication device for the neighboring cell, wherein higher received signal levels are associated with the wireless communication device needing relatively fewer autonomous gaps to acquire the SI of the neighboring cell and lower received signal levels are associated with the wireless communication device needing relatively more autonomous gaps to acquire the SI of the neighboring cell.

9. The network node of claim 5, wherein the processing circuitry is configured to adjust the times at which the wireless communication device is scheduled in the serving cell for data transmission or reception by adjusting scheduling of the wireless communication device in the serving cell to avoid scheduling data transmissions to or from the wireless communication device at times known or estimated to coincide with the autonomous gaps.

10. The network node of claim 9, wherein the processing circuitry is configured to determine the times known or estimated to coincide with the autonomous gaps, based on relating a radio link timing used in the serving cell to a radio link timing used in the neighboring cell.

11. The network node of claim 5, wherein the processing circuitry is configured to obtain the repetition level for the neighboring cell from another network node.

12. The network node of claim 5, wherein the processing circuitry is configured to obtain the repetition level from configuration information stored in the network node, or stored in a location accessible to the network node.

13. The network node of claim 5, wherein the processing circuitry is configured to determine, based on the repetition level, a minimum number of acknowledgement messages that the wireless communication device should transmit in the serving cell in response to receiving data from the serving cell during its acquisition of the SI of the neighboring cell.

14. A wireless communication device configured for operation in a wireless communication network and comprising:
- communication circuitry configured for communicating with the wireless communication network; and
- processing circuitry operatively associated with the communication circuitry and configured to:
  - receive a request to acquire System Information (SI) for a neighboring cell that neighbors a serving cell of the wireless communication device, wherein the serving and neighboring cells are included in a wireless communication network and the wireless communication device is operating under enhanced coverage with respect to the neighboring cell;
  - determine a number of repetitions needed by the wireless communication device for acquiring the SI of the neighboring cell, the repetitions being repeated transmissions of the SI for the neighboring cell; and
  - configure an SI acquisition procedure to be performed by the wireless communication device to acquire the SI for the neighboring cell, in dependence on the number of repetitions, including configuring a number of autonomous gaps to be used for acquiring the SI for the neighboring cell.

15. The wireless communication device of claim 14, wherein the processing circuitry is configured to determine the number of repetitions based at least in part on a repetition level used in the neighboring cell for transmitting the SI, for providing the enhanced coverage.

16. The wireless communication device of claim 14, wherein the processing circuitry is configured to determine the number of repetitions based at least in part on a received signal level at the wireless communication device with respect to the neighboring cell.

17. The wireless communication device of claim 14, wherein the processing circuitry is configured to determine a minimum number of acknowledgment messages that must be sent from the wireless communication device for the serving cell during the SI acquisition procedure, based at least in part on a repetition level used in the neighboring cell for transmitting the SI, for providing the enhanced coverage.

18. A network node configured for operation in a wireless communication network and comprising:
- communication circuitry configured for communicating with at least one wireless communication device operating in the wireless communication network and one or more other network nodes in the wireless communication network; and
- processing circuitry operatively associated with the communication circuitry and configured to:
  - determine that a wireless communication device is to acquire System Information (SI) of a neighboring cell that neighbors a serving cell of the wireless communication device, wherein the serving and neighboring cells are included in a wireless communication network;
  - determine that the wireless communication device is operating under enhanced coverage with respect to the neighboring cell;
  - determine a repetition level to be used for transmitting the SI for the neighboring cell, for providing the enhanced coverage from the neighboring cell, wherein at least one of a time at which the wireless communication device is scheduled in the serving cell for data transmission or reception and a time at which the wireless communication device is requested to acquire the SI of the neighboring cell is adjusted to account for additional autonomous gaps as a function of the repetition; and transmit the SI in the neighboring cell with the repetition level.

19. The network node of claim 18, wherein the processing circuitry is configured to determine that the wireless communication device is to acquire the SI of the neighboring cell, based on receiving a message from another network node.

20. The network node of claim 18, wherein the processing circuitry is configured to determine that the wireless communication device is operating under enhanced coverage with respect to the neighboring cell, based on receiving a message from another network node.

* * * * *